United States Patent [19]

Nozawa

[11] Patent Number: 5,544,293

[45] Date of Patent: Aug. 6, 1996

[54] BUFFER STORAGE SYSTEM AND METHOD USING PAGE DESIGNATING ADDRESS AND INTRA-PAGE ADDRESS AND DETECTING VALID DATA

[75] Inventor: Keizou Nozawa, Kawasaki, Japan

[73] Assignee: Fujitsu Limited, Kawasaki, Japan

[21] Appl. No.: 176,679

[22] Filed: Jan. 3, 1994

Related U.S. Application Data

[63] Continuation of Ser. No. 531,141, May 31, 1990, abandoned.

[30] Foreign Application Priority Data

Jun. 1, 1989 [JP] Japan .................... 1-140846

[51] Int. Cl.$^6$ .................... G06F 12/08; G06F 12/10; G06F 12/12
[52] U.S. Cl. .................... 395/412; 395/419; 365/189.01; 365/189.02; 365/189.07; 365/49
[58] Field of Search .................... 395/400, 425, 395/412, 419; 365/189.07, 49, 189.01, 189.02; 364/200 MS File, 900 MS File

[56] References Cited

U.S. PATENT DOCUMENTS

| | | | |
|---|---|---|---|
| 4,290,103 | 9/1981 | Hattori | 395/250 |
| 4,733,350 | 3/1988 | Tone et al. | 395/417 |
| 4,751,638 | 6/1988 | Azuma | 395/474 |
| 4,760,546 | 7/1988 | Ishida et al. | 395/467 |
| 4,779,193 | 10/1988 | Koga et al. | 395/445 |
| 4,924,425 | 5/1990 | Koga et al. | 395/250 |
| 4,943,914 | 7/1990 | Kubo | 395/403 |
| 4,989,130 | 1/1991 | Moriyama et al. | 395/775 |
| 5,014,240 | 5/1991 | Suzuki | 365/49 |
| 5,050,126 | 9/1991 | Tanaka et al. | 365/189.07 |
| 5,099,416 | 3/1992 | Tanaka et al. | 365/230.08 |
| 5,109,335 | 4/1992 | Watanabe | 395/403 |
| 5,253,203 | 10/1993 | Partovi et al. | 365/189.02 |

FOREIGN PATENT DOCUMENTS

| | | |
|---|---|---|
| 212678 | 3/1987 | European Pat. Off. . |
| 224168 | 6/1987 | European Pat. Off. . |
| 313857 | 5/1989 | European Pat. Off. . |

OTHER PUBLICATIONS

European Search Report, European Patent Office, The Hague, Searched Jan. 13, 1992.

Primary Examiner—Tod R. Swann
Assistant Examiner—James Piekari
Attorney, Agent, or Firm—Staas & Halsey

[57] ABSTRACT

A buffer storage system and method using a page designating address and an intra-page address for information processing according to a logical address is provided. The buffer storage system includes a page designating address for designating a page in a virtual address space, and an intra-page address for indicating an address in a given page. An address supply unit for outputting an address signal comprising a portion of the page designating address and the intra-page address may be included. The buffer storage system also provides a data storage unit for storing a portion of data from a main storage in a storage location corresponding to the portion of the page designating address and the intra-page address. The buffer storage system includes a plurality of address information storage units of a number determined by the portion of the page designating address. The address information storage units store address information concerning the storage location of the part of data in a storage location designated by an address of which only a portion of the page designating address is different. The buffer storage system may also include an invalidation unit for performing, in response to a write instruction to main storage, outputs of the address information storage units and a real address corresponding to the supplied logical address, a replacement of data in the data storage unit based on supplied write data and an invalidation of an address information corresponding to the data to be replaced. Replacement and invalidation may be simultaneously performed.

1 Claim, 6 Drawing Sheets

BUFFER STORAGE SYSTEM AND METHOD USING PAGE DESIGNATING ADDRESS AND INTRA-PAGE ADDRESS AND DETECTING VALID DATA

This application is a division, of application Ser. No. 07/531,141, filed May 31, 1990, now abandoned.

BACKGROUND OF THE INVENTION

1. Field of the Invention

The present invention relates to a buffer storage system using a page designating address and intra-page address. The system according to the present invention is concerned with a combination of a buffer storage and a tag storage, and a conversion between logical and real (physical) addresses in connection with a virtual storage system.

2. Description of the Related Art

In the prior art, a page in a main storage is designated, for example, by the upper 19 bits of, for example, a 31 bit logical address, and a displacement in the designated page in the main storage is represented, for example, by the lower 12 bits of the 31 bit logical address. These upper 19 bits of the logical address are referred to as a page designating address, and the lower 12 bits of the logical address are referred to as an intra-page address.

In the prior art, an address input to a buffer storage and a tag storage is an address comprising, for example, the lowest single bit of the page designating address and a plurality of bits of the intra-page address. Accordingly, the capacity of the buffer storage attains, for example, an 8K byte capacity which corresponds to 2 pages.

In the prior art, however, it is possible that invalid data corresponding to data in a page from which the data should have been replaced remains in the buffer storage, and that this invalid data is read in response to a read request from a processor. This constitutes a problem in the prior art.

SUMMARY OF THE INVENTION

An object of the present invention is to provide an improved buffer storage system using a page designating address and intra-page address in which a storage location in a buffer storage is designated by both a portion of a page designating address and an intra-page address, invalid information is detected and invalidated in parallel with the storing of data to main storage, and a buffer storage system having a large capacity is realized without increasing the scale of the circuits of the device.

In accordance with the present invention, there is provided a buffer storage system using a page designating address and intra-page address for information processing wherein a logical address instructed or designated by a processor comprises a page designating address for designating a page in a virtual address space and an intra-page address for indicating an address within the page. The buffer storage system includes the following: an address supply unit is provided for supplying an address signal comprising a portion of logical page designating and the intra-page address. A data storage unit is provided for storing a part of data in a main storage in a storage location determined by the portion of the logical page designating address and the intra-page address. A plurality of address information storage units are provided in a number determined by the portion of the logical page designating address, for storing address information concerning the storage location of that segment(s) of data into a storage location designated by an address of which only a portion of the real page designating address is different. Finally, an invalidation unit is provided, which in response to a write instruction to the main storage, the outputs of the plurality of address information storage units and a real address corresponding to a supplied logical address, replaces data stored in the data storage unit based on supplied write data and invalidates address information corresponding to the data to be replaced, whereby a replacement of data from the main storage and an invalidation of data corresponding to data erased by the replacement are carried out in parallel.

DESCRIPTION OF THE PREFERRED EMBODIMENTS

Before describing the preferred embodiments, a prior art buffer storage system, patterns of a logical address and the corresponding real address, and one of the technical features of the operation of a buffer storage system of the virtual storage type will be generally explained below with reference to FIG. 1, FIG. 2, and FIG. 3.

Figure 1:
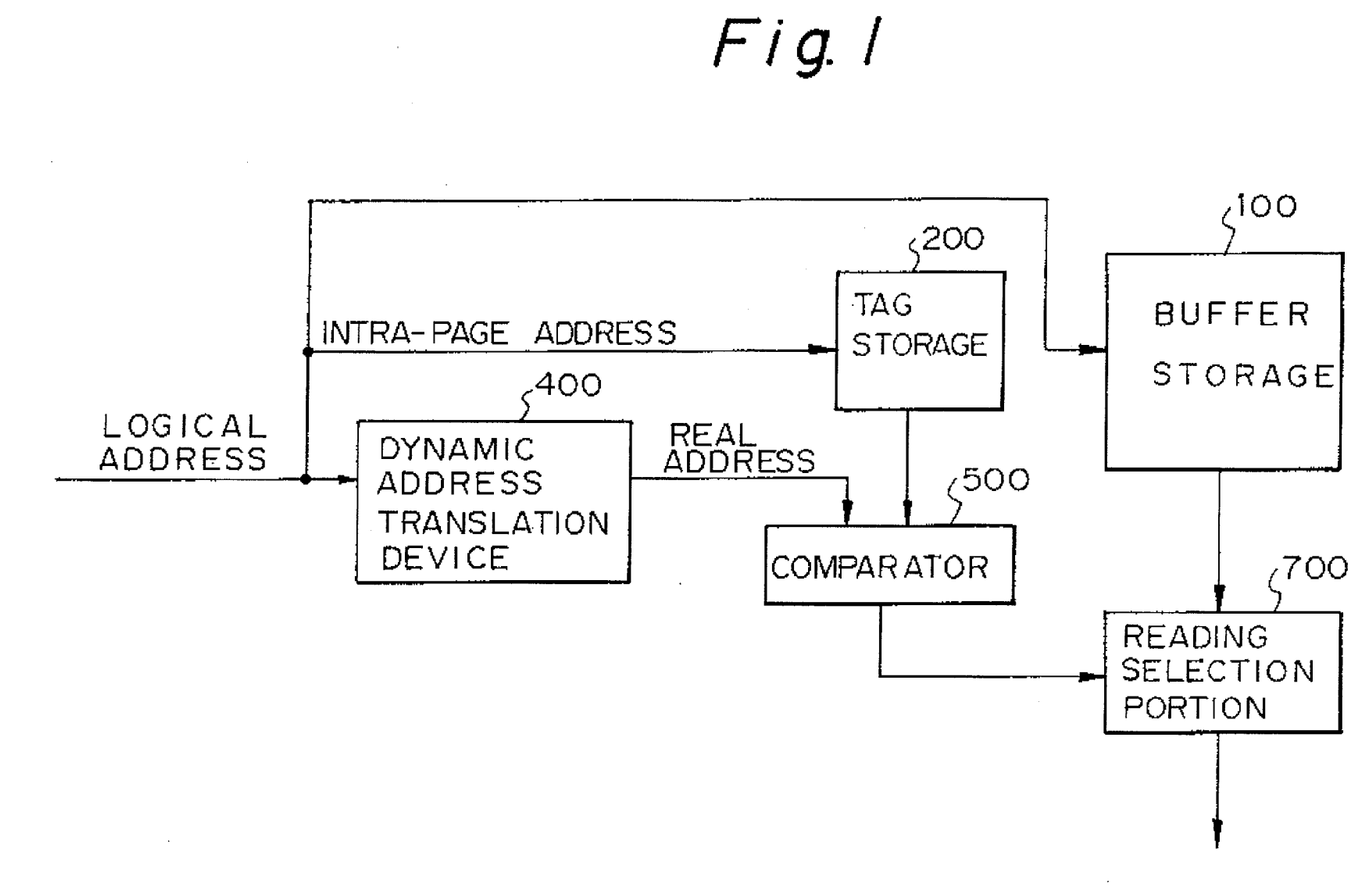
FIG. 1 shows the structure of a prior art buffer storage system.

A prior art buffer storage system shown in FIG. 1 consists of a buffer storage 100 for storing a portion of data stored in a main storage (not shown), tag storage 200, a dynamic address translation device 400, a comparator 500, and a reading selection portion 700. Readings of data from the buffer storage 100 and the tag storage 200 are carried out by an input intra-page address signal, the address data output from the tag storage 200 and the address data output from the dynamic address translation device 400 are compared in the comparator 500. Based on the comparison output from the comparator 500, the data read from the buffer storage 100 is delivered from the reading selection portion 700.

Figure 2:
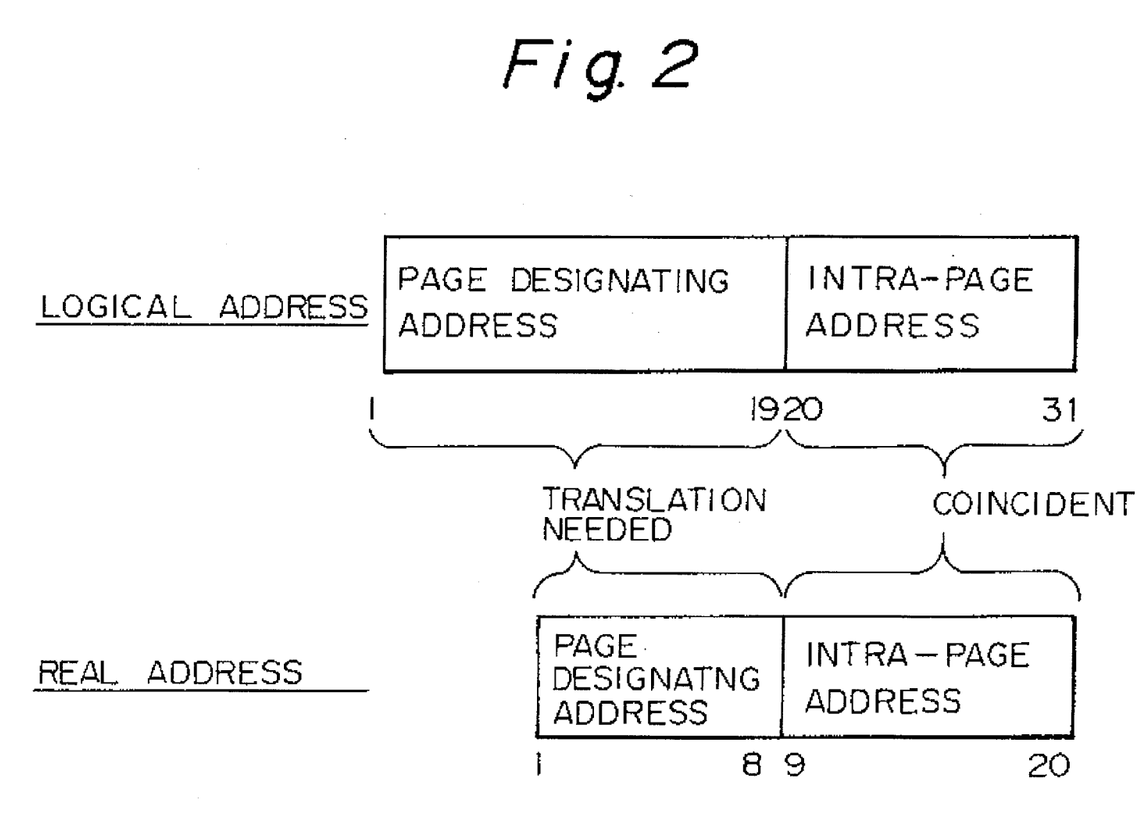
FIG. 2 shows patterns of a logical address and corresponding real address.
Figure 3:
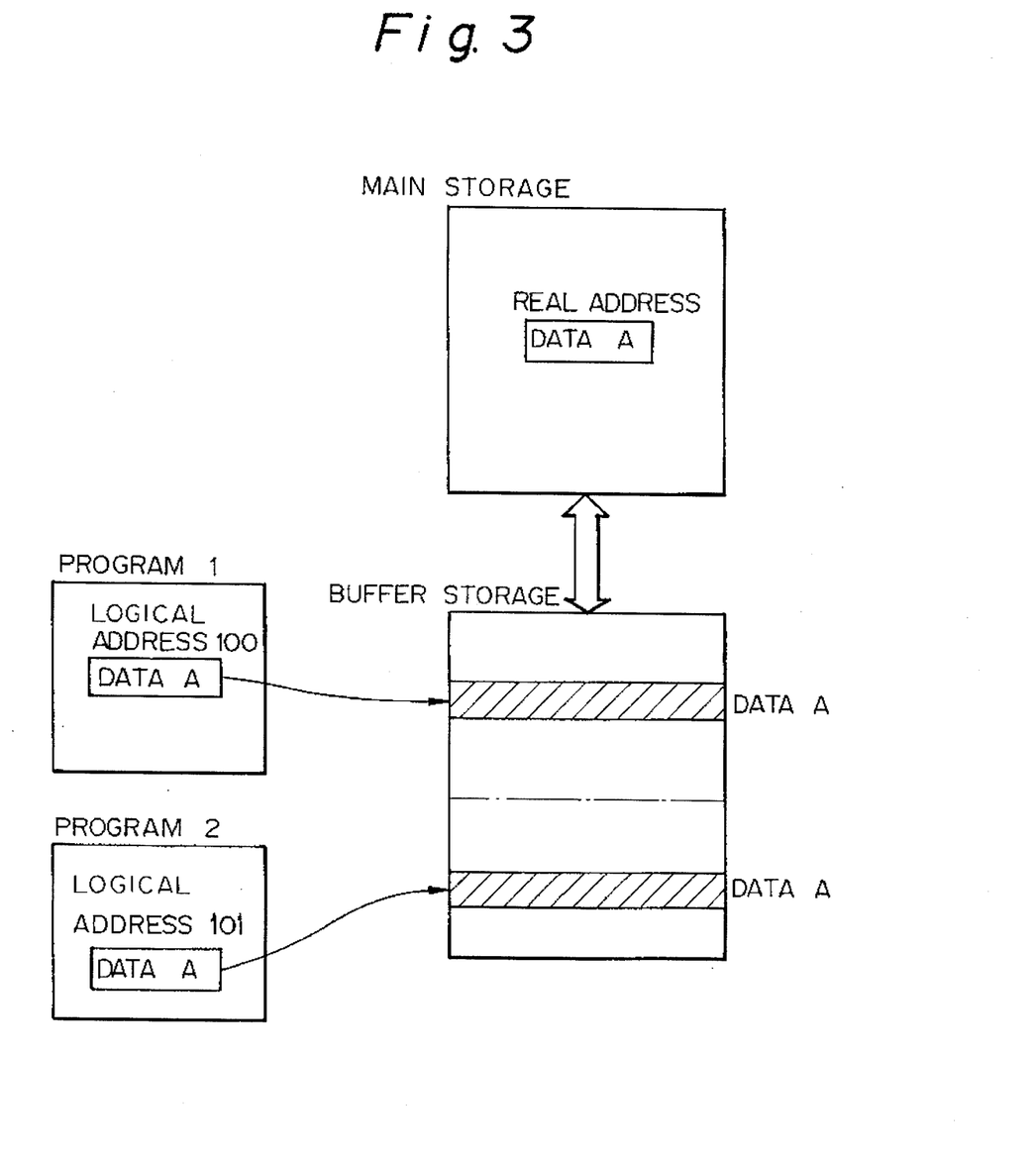
FIG. 3 illustrates one of the technical features of the operation of a buffer storage system of the virtual storage type.

Patterns of a logical address and a real address used in the system of FIG. 1 are illustrated in FIG. 2. In the main storage, the storage space is divided into pages of, for example, 4K bytes of data, and pages of virtual address space are allotted to the pages of the main storage. A page in the main storage is designated by the upper 19 bits of the logical address of 31 bits, and a displacement in the designated page in the main storage is represented by the lower 12 bits of the logical address of 31 bits. These upper 19 bits of the logical address are referred to as a logical page designating address, and the lower 12 bits of the logical address are referred to as an intra-page address.

The intra-page address in the logical address coincides with the intra-page address in the real address, but the logical page designating address of 19 bits in the logical address does not coincide with the page designating address of 8 bits in the real address. The logical page designating address in the logical address is translated into the real page designating address of the real address by a dynamic address translation device. In the system of FIG. 1, only the intra-page addresses, which do not need address translation, are used for reading the buffer storage.

In the prior art, a plurality of 4K byte storage elements, e.g., sixteen 4K byte storage elements, is replaced by a single large capacity storage element. Accordingly, the storage capacity of the buffer storage is increased without increasing the scale of the circuits of the device.

In this prior art, an address input to the buffer storage 100 and the tag storage 200 is an address consisting of the lowest single bit of the page designating address and a plurality of bits of the intra-page address. Accordingly, the capacity of the buffer storage 100 attains an 8K byte capacity which corresponds to 2 pages. In this prior art, however, it is possible that invalid data corresponding to data in a page from which the data should have been moved out or replaced remains in the buffer storage 100, and that this invalid data is read in response to a read request from a processor. This problem in the prior art can be illustrated, for example, as shown in FIG. 3. Predetermined data A is stored in a real address in the main storage. In a virtual storage system, this real address of data A in the main storage corresponds, for example, to logical address 100 in program No. 1, and to logical address 101 in program No. 2. In the buffer storage, data A for program No. 1 is stored in a location in the upper part, and data A for program No. 2 is stored in a location in the lower part.

Under such conditions, if data A in the location in the upper part of the buffer storage is replaced and new data is stored in accordance with program No. 1, it is necessary to also replace data A in the location in the lower part of the buffer storage. Nevertheless, it is possible that data A remains in the location in the lower part of the buffer storage, and this causes a problem.

A first embodiment of the present invention will now be explained.

Figure 4:
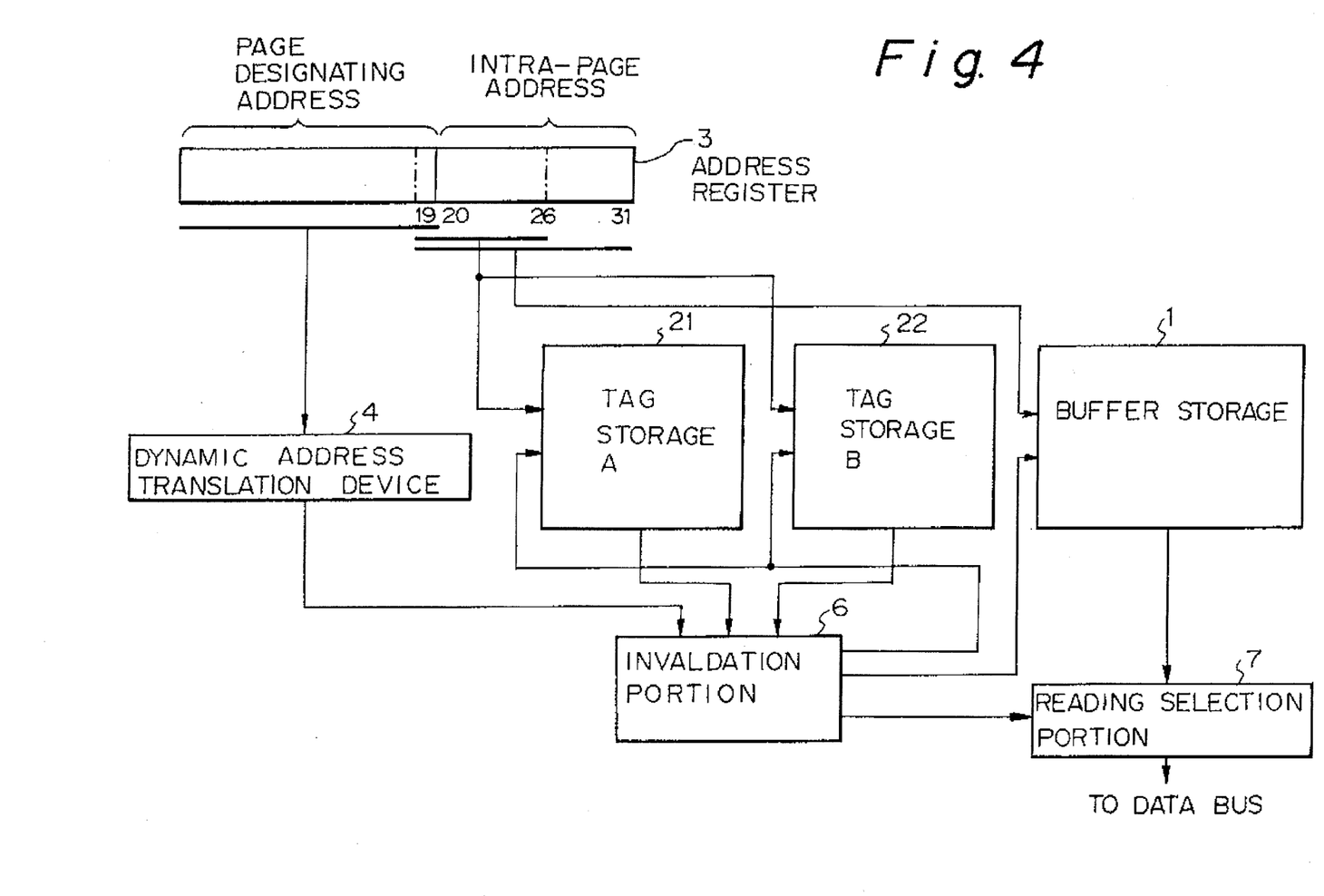
FIG. 4 is a schematic diagram illustrating a buffer storage system using a page designating address and intra-page address according to an embodiment of the present invention.
Figure 5:
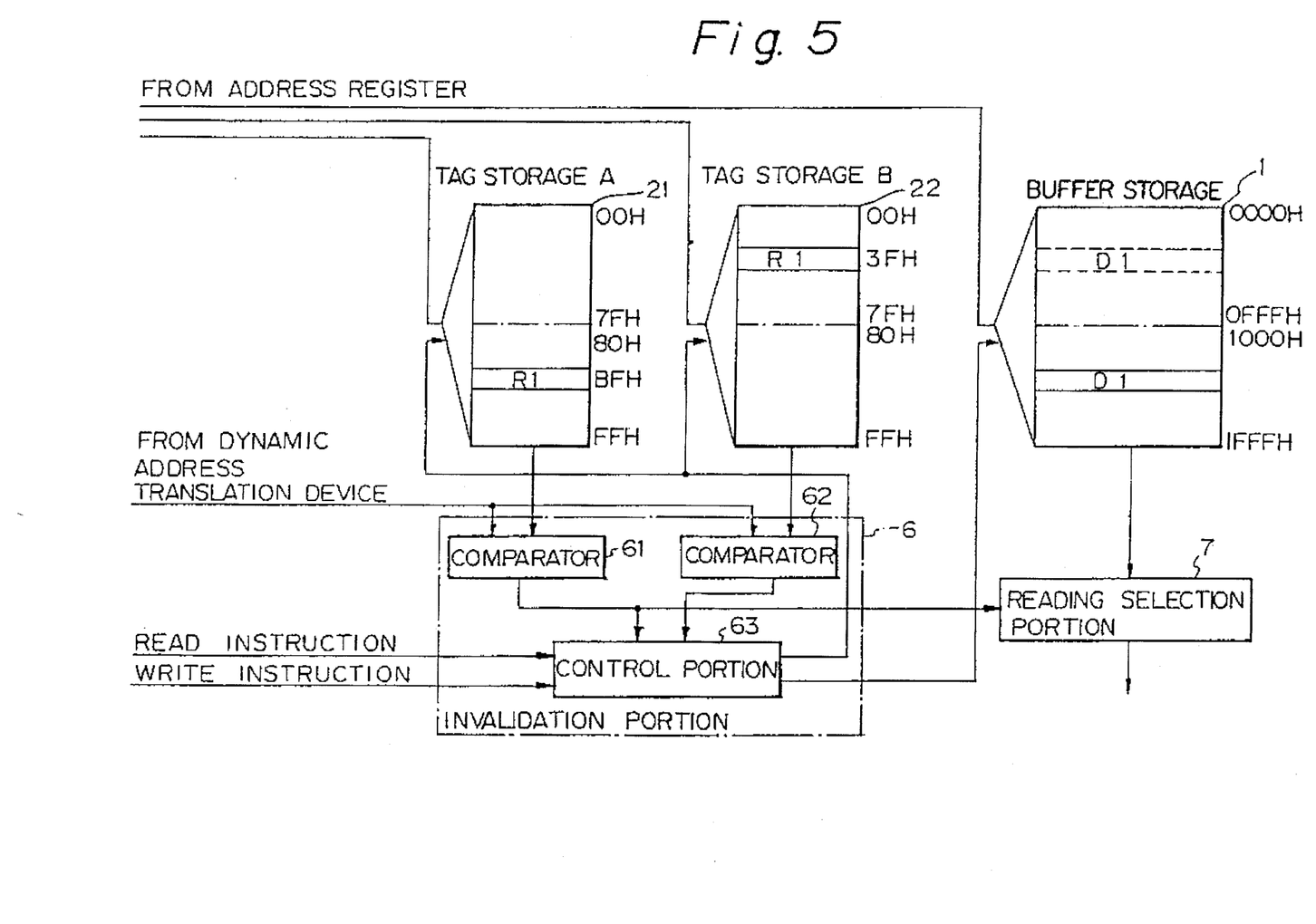
FIG. 5 shows the structure of the buffer storage system of FIG. 4.

A schematic diagram of a buffer storage system using a part of logical page designating address and intra-page address according to the first embodiment of the present invention is shown in FIG. 4, and the structure of the system of FIG. 4 is shown in FIG. 5. The illustrations of FIGS. 2 and 3 are applicable to the explanation of the operation of the system of FIGS. 4 and 5.

The system of FIG. 4 includes a buffer storage 1 for storing a portion of data stored in a main storage (not shown), tag storages 21 and 22 for storing a page designating a portion of a real address corresponding to data stored in the buffer storage 1, an address register 3 for storing a logical address comprising a logical page designating address and an intra-page address, a dynamic address translation (DAT) device 4 for converting a logical page designating address of a logical address into a real page designating address of a real address, an invalidation portion 6 for storing data in the buffer storage 1 on the basis of write data and invalidating address information corresponding to stored data in question in the tag storages 21 and 22, and a reading selection portion 7 for selecting a reading of data from the buffer memory 1 to be supplied to a data bus.

The logical address stored in the address register 3 includes a logical page designating address of the upper 19 bits (bit Nos. 1 to 19) and an intra-page address of the lower 12 bits (bit Nos. 20 to 31).

As the address input to the buffer storage, the lowest bit (i.e., bit No. 19 of the logical address), of the logical page designating address in virtual address space, and the intra-page address (i.e., bit Nos. 20 to 31 of the logical address) are supplied to the buffer storage 1. As the address input to the tag storage, the lowest bit, i.e., bit No. 19 of the logical address, of the logical page designating address, and the upper 7 bits, i.e., bit Nos. 20 to 26 of the logical address, of the intra-page address are supplied to each of the tag storages 21 and 22.

In the system of FIG. 4, an access address of the buffer storage 1 is represented by 13 bits comprising 12 bits of the intra-page address and 1 bit from the logical page designating address, and accordingly, the capacity of the buffer storage 1 can be made 8K bytes corresponding to 2 pages by using only a single storage having a capacity of 8K bytes. Thus, the capacity of the buffer storage system is increased without increasing the scale of the circuits of the device.

The structures of the buffer storage 1, the tag storages 21 and 22, and the invalidation portion 6 are shown in FIG. 5. The invalidation portion 6 includes comparators 61 and 62 and a control portion 63. The respective outputs of the tag storages 21 and 22 are compared individual with the real page designating portion of a real address output by the dynamic address translating device 4 in the corresponding comparators 61 and 62. The data read from the buffer storage 1 is selected and delivered by the reading selection portion 7 under the control of the output of the comparator 61. Store operations to the buffer storage 1 and the tag storages 21 and 22 and invalidation operations with respect to the tag storages 21 and 22 for invalidating tag data are controlled by the control portion 63.

For example, a data block D1 having a data length of 32 bytes is stored in the region of the addresses 1000H through 1FFFH of the buffer storage 1, where the lowest bit of the logical page designating address is "1", and a data block D1' having a data length of 32 bytes is stored in the region of the addresses 0000H through 0FFFH of the buffer storage 1, where the lowest bit of the logical page designating address is "0". Here, the character H is used to indicate a hexadecimal number.

In the tag storage 21, the page designation portion of the main storage corresponding to the data block is stored as tag data in the location corresponding to the bit No. 19 of the logical page designating address and the upper 7 bits of the intra-page address. In the tag storage 22, tag data corresponding to the data block is stored in the location where only bit No. 19 of the logical address for designating the data block is inverted.

For example, the tag data corresponding to the data block R, in question is stored in the location "BFH" of the tag storage 21, where the lowest bit of the page designating address is "1" and the upper 7 bits of the intra-page address are "0111111". The tag data corresponding to the data block R, in question is stored in the location "3FH" of the tag storage 22.

In a location of each of the tag storages 21 and 22, there are provided a tag data portion for storing tag data and a validity bit for indicating whether the tag data stored in the tag data portion is valid. When the stored tag data is valid, "0" is stored in the validity bit, and when the stored tag data is invalid, "1" is stored in the validity bit.

Each of the tag storages 21 and 22 delivers tag data when the validity bit is "0", but does not deliver tag data when the validity bit is "1".

In each of the comparators 61 and 62, tag data read from the tag storage 21 or 22 and the page designation portion of the real address supplied from the real dynamic address translator is compared, and a signal "1" is delivered, when the compared data coincide, or a signal "0" is delivered when the compared data do not coincide.

The output of the comparator 61 represents the determination of whether the data in question exists in a location of the buffer storage 1 corresponding to a logical address. This output is supplied to the reading selection portion 7 which delivers data read from the buffer storage 1 to a data bus when a signal "1", acting as a hit signal, is supplied from the comparator 61.

The output of the comparator 62 represents the determination whether the data in question exists in a location of the buffer storage 1 corresponding to a logical address in which only bit No. 19 of a logical address is inverted.

In accordance with the operations of the comparators 61 and 62 based on tag data read from the tag storages 21 and 22, it is determined whether invalid data exists in the buffer storage 1. In accordance with the operation of the control portion 63 based on the above-mentioned determination, invalidation processings of a data block stored in the buffer storage 1 and tag data stored in the tag storages 21 and 22 are carried out.

Due to the operation of the invalidation portion 6 including the comparators 61 and 62, and the control portion 63, all of the invalid data which might be stored in the buffer storage 1 are invalidated in parallel with storing of data in the main storage corresponding to the buffer storage 1. Thus an erroneous reading of invalid data from the buffer storage 1 is prevented.

Although, in the above-described embodiment with reference to FIG. 4, the lowest single bit No. 19 of the logical page designating address is used for the address inputs to the buffer storage 1 and the tag storages 21 and 22, it is possible alternatively to use a plurality of bits of the logical page designating address. An example of this alternative is illustrated in FIG. 6 as a second embodiment of the present invention.

Figure 6:
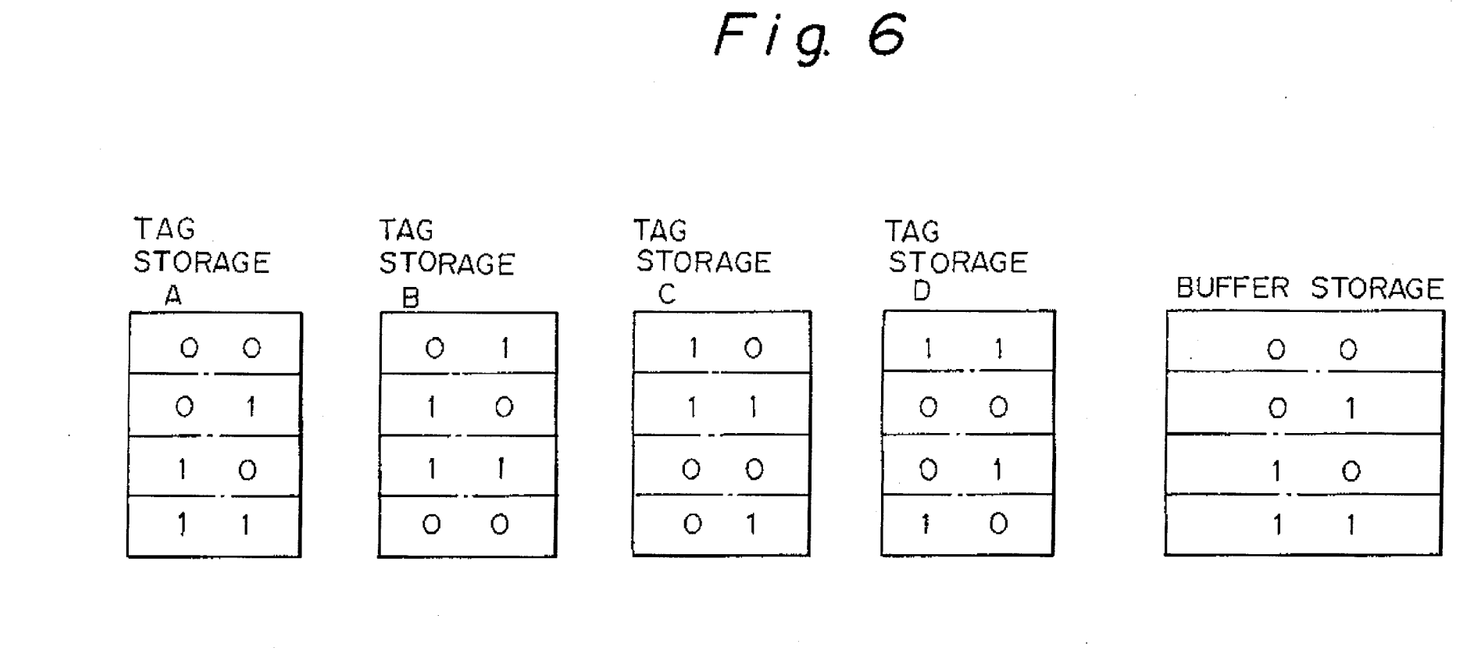
FIG. 6 illustrates an operation of buffer storage and tag storage in a buffer storage system according to another embodiment of the present invention.

In the embodiment of FIG. 6, bit Nos. 18 and 19, as the lowest two bits of the logical page designating address, are used for the address inputs to the buffer storage 1 and the tag storages 21 and 22. In the embodiment described in FIG. 6, there are provided four tag storages A, B, C, and D in correspondence with bit Nos. 18 and 19 of the page designating address. The two numerals "00", "01", . . . indicated in each of the four sections of each of the tag storages A, B, C, and D represent bit Nos. 18 and 19 of a logical address corresponding to each of the sections.

I claim:

1. A buffer storage system using logical page designating addresses and intra-page addresses for information processing of data moved-in from a main storage unit, wherein a logical address output by a processor includes a logical page designating address and an intra-page address, said buffer storage system comprising:

address supply means for supplying a first address signal having a portion of the logical page designating address and the intra-page address and a second address signal having a portion of the logical page designating address and a portion of the intra-page address;

data storage means for storing a segment of data from the main storage unit in a data storage location designated by the first address signal received from said address supply means;

a plurality of address information storage means for storing address information concerning the data storage location in an address storage location designated by the second address signal, a number of said plurality of address information storage means being based on the portion of the logical page designating address, first address information storage means, among the plurality of address information storage means, being used for controlling an access to the data storage means and second address information storage means, among the plurality of address information storage means and in performing a write access operation, being supplied with a modified second address signal in which only the portion of the logical page designating address is different and which is used for an invalidation operation; and invalidation means, responsive to a write instruction from the processor to the main storage unit and a comparison result, of comparing a supplied real page designating address with outputs of the second address information storage means, for setting a state of the address information of the first and second address information storage means, which corresponding to the outputs, to an invalid state.

* * * * *

UNITED STATES PATENT AND TRADEMARK OFFICE
CERTIFICATE OF CORRECTION

PATENT NO. : 5,544,293
DATED : Aug. 6, 1996
INVENTOR(S) : NOZAWA

It is certified that error appears in the above-indentified patent and that said Letters Patent is hereby corrected as shown below:

Col. 1, line 60, after "designating" insert --address--.

Signed and Sealed this

First Day of July, 1997

Attest:

Attesting Officer

BRUCE LEHMAN

Commissioner of Patents and Trademarks